US011975532B2

(12) United States Patent
Fujiwara et al.

(10) Patent No.: US 11,975,532 B2
(45) Date of Patent: May 7, 2024

(54) TRANSPORT DEVICE, PRINTING APPARATUS, AND TRANSPORT CONTROLLING METHOD

(71) Applicant: SEIKO EPSON CORPORATION, Tokyo (JP)

(72) Inventors: Daisuke Fujiwara, Matsumoto (JP); Ryo Hamano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 17/817,005

(22) Filed: Aug. 2, 2022

(65) Prior Publication Data

US 2023/0043935 A1 Feb. 9, 2023

(30) Foreign Application Priority Data

Aug. 3, 2021 (JP) ................................ 2021-127139

(51) Int. Cl.

| | |
|---|---|
| ***B41J 15/16*** | (2006.01) |
| ***B65H 18/10*** | (2006.01) |
| ***B65H 23/16*** | (2006.01) |
| ***B65H 23/188*** | (2006.01) |

(52) U.S. Cl.

CPC ............. *B41J 15/16* (2013.01); *B41J 15/165* (2013.01); *B65H 18/103* (2013.01); *B65H 23/16* (2013.01); *B65H 23/1888* (2013.01); *B65H 2404/147* (2013.01); *B65H 2511/214* (2013.01); *B65H 2553/51* (2013.01); *B65H 2801/15* (2013.01)

(58) Field of Classification Search

CPC ....... B41J 15/16; B41J 15/165; B65H 18/103; B65H 2404/147; B65H 23/1888; B65H 2553/51; B65H 23/16; B65H 2511/214; B65H 2801/15

See application file for complete search history.

(56) References Cited

U.S. PATENT DOCUMENTS

2013/0068814 A1* 3/2013 Kuwana ............. B65H 23/1888 226/1
2014/0045666 A1* 2/2014 Endou .................. B65H 23/038 493/186
2020/0071113 A1* 3/2020 Hamano ................ B41J 15/165

FOREIGN PATENT DOCUMENTS

JP 2020-33163 3/2020

* cited by examiner

*Primary Examiner* — Henok D Legesse
(74) *Attorney, Agent, or Firm* — WORKMAN NYDEGGER

(57) ABSTRACT

Provided are: a holding unit configured to rotatably hold a roll body on which a medium is wound; a transport unit configured to transport the medium unwound from the roll body; a tension applying unit configured to press the medium between the holding unit and the transport unit to apply tension to the medium; a driving portion configured to provide driving force to the tension applying unit; a control unit configured to control the transport unit and the driving portion; and a detector configured to detect a load applied to the transport unit, and the control unit controls the driving force by the driving portion on the basis of the load detected by the detector to adjust the tension applied to the medium.

6 Claims, 9 Drawing Sheets

TRANSPORT DEVICE, PRINTING APPARATUS, AND TRANSPORT CONTROLLING METHOD

The present application is based on, and claims priority from JP Application Serial Number 2021-127139, filed on Aug. 3, 2021, the disclosure of which is hereby incorporated by reference herein in its entirety.

BACKGROUND

1. Technical Field

The present disclosure relates to a transport device, a printing apparatus, and a transport controlling method.

2. Related Art

A transport device configured to transport a medium wound into a roll body has been known. A transport device in JP-A-2020-33163 holds a roll body by using a hold unit configured to be able to rotate with driving force. At the time of transporting a medium, the transport device detects tension acting on the medium. The transport device controls driving force acting on the holding unit on the basis of a result of detection of the tension.

However, as the size of the transport device increases, the diameter of the roll body mounted at the holding unit increases. With the increase in the diameter of the roll body, the inertial at the time of causing the roll body to rotate also increases. This inertial leads to a reduction in the accuracy of controlling transport of the medium using the driving force applied to the holding unit.

SUMMARY

A transport device according to the present disclosure includes a holding unit configured to rotatably hold a roll body on which a medium is wound, a transport unit configured to transport the medium unwound from the roll body, a tension applying unit configured to press the medium between the holding unit and the transport unit to apply tension to the medium, a driving portion configured to provide driving force to the tension applying unit, a control unit configured to control the transport unit and the driving portion, and a detector configured to detect a load applied to the transport unit, and the control unit controls the driving force by the driving portion on the basis of the load detected by the detector to adjust the tension applied to the medium.

A printing apparatus according to the present disclosure includes a holding unit configured to rotatably hold a roll body on which a medium is wound, a transport unit configured to transport the medium unwound from the roll body, a printing unit configured to perform printing on the medium transported by the transport unit, a tension applying unit configured to press the medium between the holding unit and the transport unit to apply tension to the medium, a driving portion configured to provide driving force to the tension applying unit, a control unit configured to control the transport unit and the driving portion, and a detector configured to detect a load applied to the transport unit, and the control unit controls the driving force by the driving portion on the basis of the load detected by the detector.

A transport controlling method according to the present disclosure includes transporting, by a transport unit, a medium wound in a roll body held by a holding unit, pressing, by a tension applying unit, the medium between the holding unit and the transport unit to apply tension to the medium, detecting a load applied to the transport unit, and controlling a driving portion configured to provide driving force to the tension applying unit on the basis of the detected load.

DESCRIPTION OF EXEMPLARY EMBODIMENTS

1. Configuration of Printer 10

Figure 1:
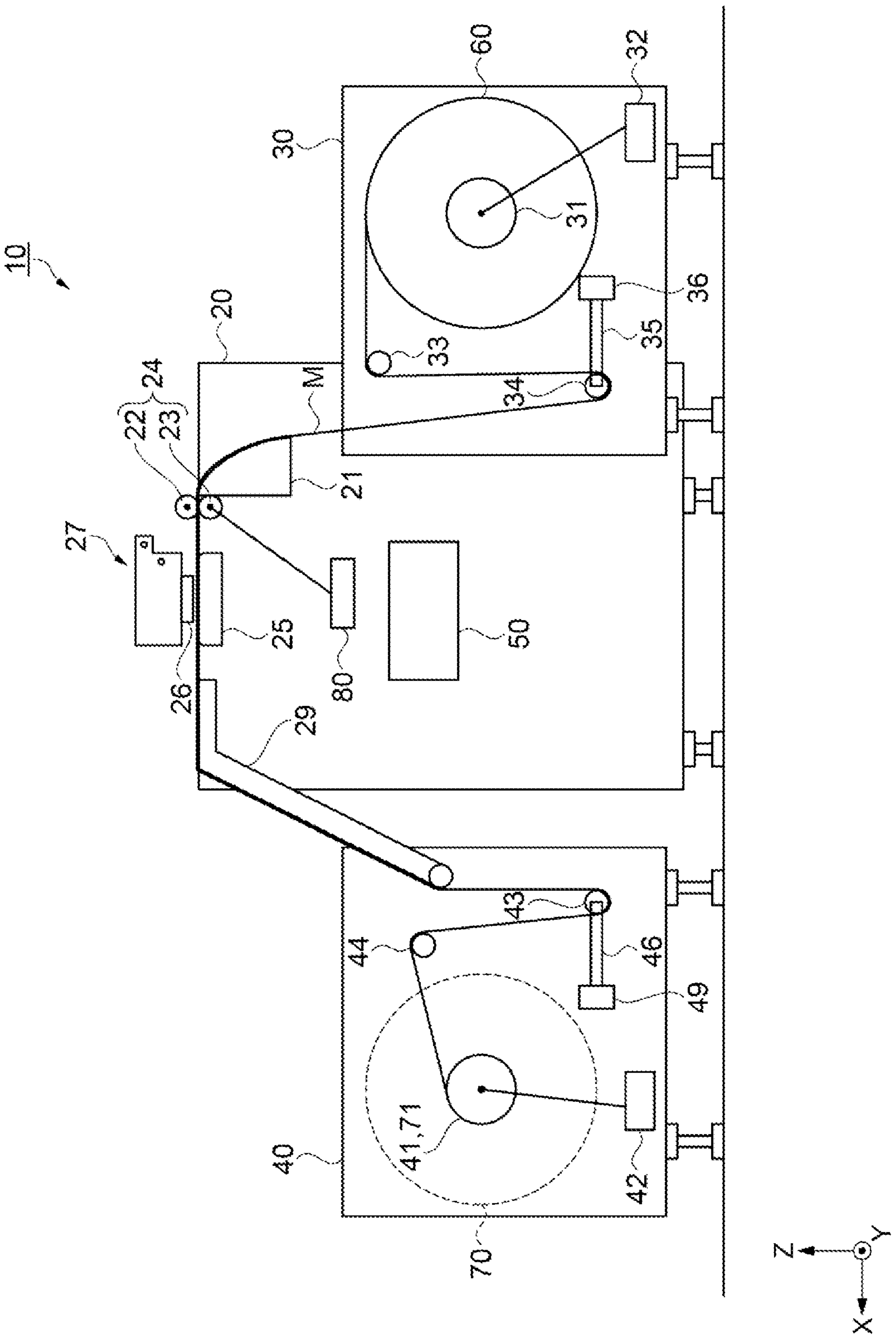
FIG. 1 is a schematic view illustrating a cross section of a configuration of a printer.

FIG. 1 is a schematic view illustrating a cross section of the configuration of a printer 10. The printer 10 is an inkjet printer configured to discharge ink onto a medium M to perform printing. The printer 10 includes a printing unit 20, a supplying unit 30 configured to send out the medium M, and a winding unit 40. The printer 10 corresponds to one example of a printing apparatus. The medium M corresponds to one example of a medium.

An XYZ coordinate system is indicated in part of the drawings including FIG. 1. The X-axis, the Y-axis, and the Z-axis are perpendicular to each other. The X-axis is parallel to an installation surface of the printer 10, and corresponds to the width of the printer 10. The Y-axis is parallel to an installation surface of the printer 10, and corresponds to the depth of the printer 10. The Z-axis is perpendicular to an installation surface of the printer 10, and corresponds to the height of the printer 10.

Hereinafter, when the XYZ coordinate system is indicated, the +X direction parallel to the X-axis indicates a direction directed from the supplying unit 30 toward the winding unit 40. In a case of FIG. 1, the +X direction indicates a direction directed from the center of the drawing toward the left. The −X direction parallel to the X-axis indicates a direction directed from the winding unit 40 toward the supplying unit 30. In a case of FIG. 1, the −X direction of the X-axis indicates a direction directed from the center of the drawing toward the right. The +Y direction parallel to the Y-axis indicates a direction directed from the back side of the printer 10 toward the front when the winding unit 40 is disposed at the left relative to the printing unit 20. In a case of FIG. 1, the +Y direction parallel to the Y-axis indicates a direction toward the viewer of the drawing. The −Y direction parallel to the Y-axis indicates a direction directed from the front side of the printer 10 toward the back when the winding unit 40 is disposed at the left relative to the printing unit 20. In a case of FIG. 1, the −Y direction parallel to the Y-axis indicates a direction going away from the viewer of the drawing. The +Z direction parallel to the Z-axis indicates a direction directed upward from the installation surface of the printer 10. In a case of FIG. 1, the +Z direction parallel to the Z-axis indicates a direction directed upward from the center of the drawing. The −Z direction parallel to the Z-axis indicates a direction directed from above the printer 10 toward the installation surface. In a case of FIG. 1, the −Z direction parallel to the Z-axis indicates a direction directed downward from the center of the drawing.

The printing unit 20 includes a supply guide frame 21, a transport roller pair 24 including a first transport roller 22 and a second transport roller 23, a platen 25, a printing head 26, a carriage 27, an ejection guide frame 29, a controlling unit 50, and a load detecting sensor 80.

The supply guide frame 21 guides a medium M sent out from the supplying unit 30 to the transport roller pair 24. The supply guide frame 21 guides the medium M to an oblique direction intersecting the +X direction and the +Z direction. The supply guide frame 21 may be comprised of one member, or may be comprised of a plurality of members.

The transport roller pair 24 includes the first transport roller 22 and the second transport roller 23, and is able to transport the medium M. The transport roller pair 24 corresponds to one example of a transport unit. The first transport roller 22 is disposed at a position in the +Z direction relative to the medium M. The second transport roller 23 is disposed at a position in the −Z direction relative to the medium M. The first transport roller 22 or the second transport roller 23 is driven to rotate with driving force from a transport-roller driving mechanism 126 that will be described later. The first transport roller 22 and second transport roller 23 are pressed against each other to transport the medium M to the printing head 26 in a state where the medium M is sandwiched between them.

The platen 25 is disposed at a position in the −Z direction relative to the printing head 26. The platen 25 is a flat sheet-like member configured to support the medium M transported by the transport roller pair 24. When a suction fan is provided at a position in the −Z direction relative to the platen 25, the platen 25 includes a through hole that allows air to flow through. With the airflow made by the suction fan, the medium M is drawn toward the platen 25.

The printing head 26 is able to discharge ink onto the medium M supported by the platen 25 to perform printing. The printing head 26 is an inkjet head. By discharging ink, the printing head 26 forms an image on the medium M. The printing head 26 corresponds to one example of a printing unit.

The carriage 27 supports the printing head 26. The carriage 27 moves along an axis parallel to the Y-axis. When the carriage 27 moves above the medium M along the axis parallel to the Y-axis, the printing head 26 discharges ink onto the medium M to form an image on the medium M.

The ejection guide frame 29 guides, to the winding unit 40, the medium M on which printing is performed by the printing head 26. The ejection guide frame 29 guides the medium M in +X direction and an oblique direction intersecting the −Z direction. The ejection guide frame 29 may be comprised of one member, or may be comprised of a plurality of members.

A drying unit that is not illustrated may be provided at a position that is opposed to the ejection guide frame 29. The drying unit includes, for example, a heater serving as a heat source. The drying unit heats the medium M on the ejection guide frame 29 to facilitate fixing of the discharged ink on the medium M.

The controlling unit 50 performs various types of control such as control of transporting of the medium M and control of printing performed on the medium M. The controlling unit 50 includes a central processing unit (CPU), a read only memory (ROM), a random access memory (RAM), a storage, or the like, which are not illustrated. The controlling unit 50 acquires a result of the detection from various types of sensors to perform various types of control. The controlling unit 50 may acquire print data to perform various types of control on the basis of the acquired print data. The controlling unit 50 may be comprised of one unit or may be comprised of a plurality of units. The controlling unit 50 corresponds to one example of a control unit.

The load detecting sensor 80 detects a load applied to the transport roller pair 24. The load detecting sensor 80 illustrated in FIG. 1 detects a transport current I when the transport roller pair 24 transports the medium M. The detection data detected by the load detecting sensor 80 is transmitted to the controlling unit 50. The load detecting sensor 80 corresponds to one example of a detector. The load detecting sensor 80 is not limited to a unit that measures the transport current I. For example, it may be possible to use a tension measuring device configured to measure tension of the medium M transported from the supplying unit 30 to the printing unit 20.

The supplying unit 30 includes a medium-roll supporting shaft 31, a medium-roll driving mechanism 32, a supply guide member 33, a supply bar member 34, a supply-bar supporting member 35, and a supply-bar driving mechanism 36. The supplying unit 30 is supplied with a medium roll 60 in which the medium M is wound in a roll form. The medium roll 60 corresponds to one example of a roll body.

The medium-roll supporting shaft 31 supports the medium roll 60. The medium-roll supporting shaft 31 is rotatably supported at a frame or the like. This frame or the like is not illustrated and is disposed at an end portion at the +Y direction and an end portion at the −Y direction of the supplying unit 30. As the medium-roll supporting shaft 31 rotates, the medium roll 60 rotates. With the rotation of the medium roll 60, the medium M is delivered. The medium-roll supporting shaft 31 corresponds to one example of a holding unit.

The medium-roll driving mechanism 32 causes the medium-roll supporting shaft 31 to rotate on the basis of control by the controlling unit 50. The medium-roll driving mechanism 32 includes a drive source such as a motor that is not illustrated, a transmission mechanism configured to transmit driving force from the drive source, and a control circuit configured to operate the drive source on the basis of a signal from the controlling unit 50.

The supply guide member 33 guides the medium M delivered from the medium roll 60. The supply guide member 33 guides the medium M in the +X direction and an oblique direction intersecting the −Z direction. The supply guide member 33 is a roll member by way of example. The roll member may be rotatably supported or may be supported so as not to be able to rotate. In order to enhance the sliding property of the medium M, the roll member is desirable to be supported in a rotatable manner.

The supply bar member 34 is supported by the supply-bar supporting member 35. The medium M guided by the supply guide member 33 is wrapped around the supply bar member 34, and tension is applied to the medium M. The supply bar member 34 is disposed between the medium-roll supporting shaft 31 and the transport roller pair 24 in the transport path through which the medium M is transported. The supply bar member 34 is in contact with the medium M directly or through a cover member that is not illustrated. The cover member is, for example, a friction member configured to provide the medium M with frictional force. That is, the supply bar member 34 is able to come into contact with the medium M directly or indirectly. The supply bar member 34 guides the medium M through the supply guide frame 21 to the transport roller pair 24. The supply bar member 34 guides the medium M in the substantially +Z direction. When the supply-bar driving mechanism 36 that will be described later operates, the supply bar member 34 applies tension to the medium M by its own weight. The supply bar member 34 has any shape as long as it can apply tension to the medium M. However, the supply bar member 34 is desirable to have a tubular shape or cylindrical shape extending in a direction along the Y-axis. The supply bar member 34 uses an extruded member made of a metal material such as aluminum or SUS or a member obtained by shaping a pipe made of a metal material such as aluminum or SUS. The supply bar member 34 corresponds to one example of a tension bar.

Supply-bar supporting members 35 are disposed at a position at the +Y direction relative to the supply bar member 34 and a position at the +Y direction with the supply bar member 34 being interposed between the supply-bar supporting members 35. The supply-bar supporting members 35 support the supply bar member 34 so as to be able to move. The supply bar member 34 and the supply-bar supporting members 35 correspond to one example of a tension applying unit.

The supply-bar driving mechanism 36 provides driving force to the supply-bar supporting member 35 on the basis of control by the controlling unit 50. The supply-bar driving mechanism 36 includes a supply-bar driving source configured to generate driving force that will be described later. As the medium M is transported in a state where the driving force is being provided, the supply-bar supporting members 35 and the supply bar member 34 supported by the supply-bar supporting members 35 swing. In a case of FIG. 1, the supply-bar driving mechanism 36 causes the supply-bar supporting member 35 and the supply bar member 34 supported by the supply-bar supporting member 35 to swing with an imaginary supply-bar swing shaft that is not illustrated being the center. That is, the supply-bar driving mechanism 36 is able to adjust biasing force used for the supply bar member 34 to bias the medium M. The supply-bar swing shaft does not match a rotary shaft, not illustrated, of the medium-roll supporting shaft 31. The supply-bar swing shaft may match the rotary shaft of the medium-roll supporting shaft 31. By adjusting the driving force provided to the supply-bar supporting member 35, the supply-bar driving mechanism 36 adjusts tension applied to the medium M in association with the swing of the supply bar member 34. The supply-bar driving mechanism 36 adjusts the tension acting at a portion of the medium M that extends from the medium roll 60 to the transport roller pair 24. The supply-bar driving mechanism 36 corresponds to one example of a driving portion. The supply-bar driving mechanism 36 illustrated in FIG. 1 causes the supply-bar supporting member 35 and the supply bar member 34 to swing. However, the configuration thereof is not limited to this. The supply-bar driving mechanism 36 may cause the supply-bar supporting member 35 and the supply bar member 34 to perform translational movement along an axis parallel to the Z-axis. The trace of the supply-bar supporting member 35 and the supply bar member 34 at the time of the translational movement is not limited to the axis parallel to the Z-axis, and may be changed on an as-necessary basis so as to match the path of the medium M.

Note that the medium M is wrapped around the supply bar member 34 to apply tension to the medium M. However, the configuration is not limited to this. For example, the medium M may be pressed by an item that is brought into line contact or point contact with the medium M to apply tension to the medium M.

Figure 2:
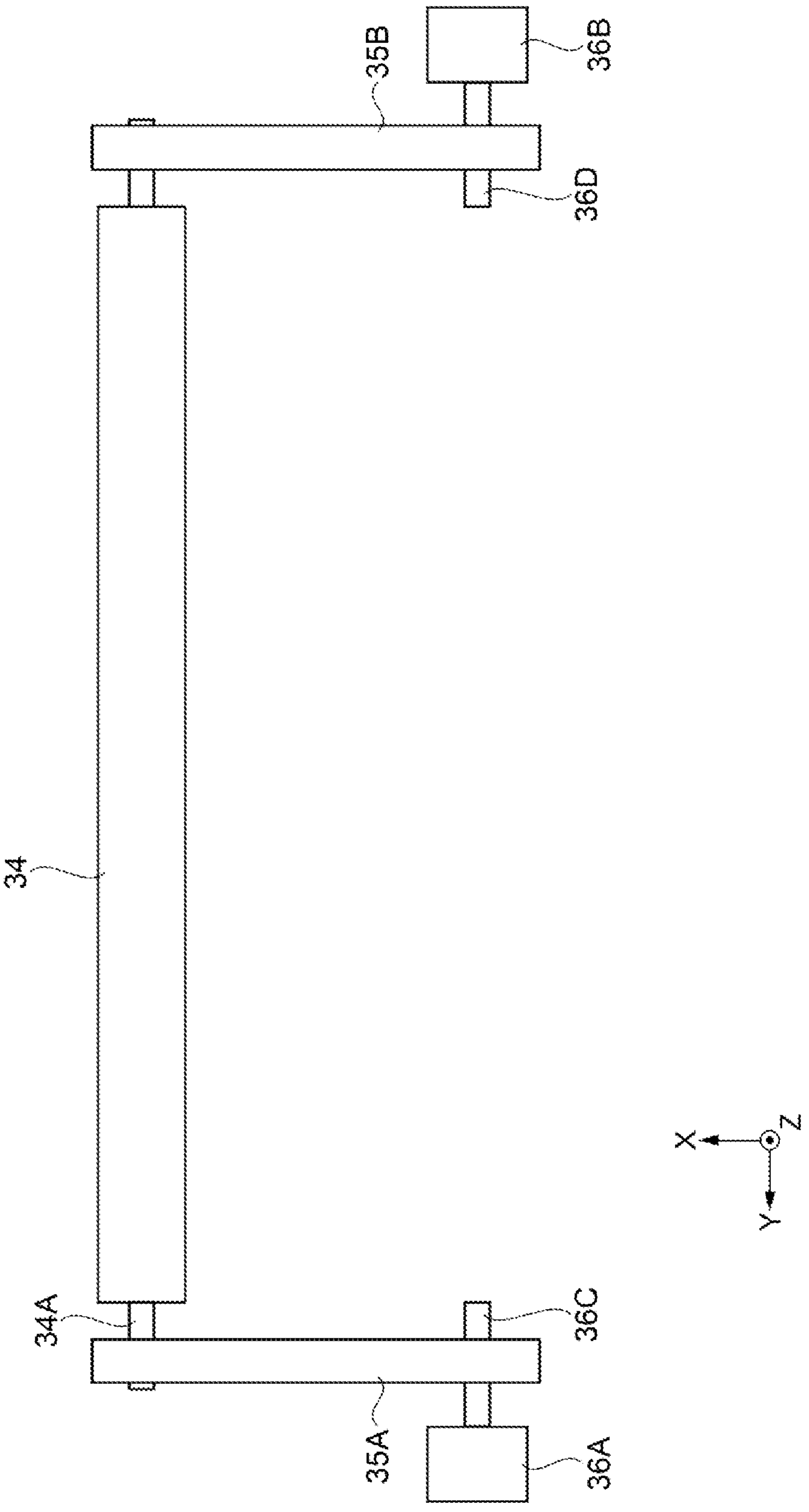
FIG. 2 is a diagram illustrating a configuration used to cause a supply bar member to drive.

FIG. 2 illustrates one example of a configuration used to move the supply bar member 34. FIG. 2 illustrates one example of the supply bar member 34, the supply-bar supporting member 35, and the supply-bar driving mechanism 36. The supply bar member 34 includes a supply bar shaft 34A.

The supply bar shaft 34A extends along an axis parallel to the Y-axis from a position of one end of the supply bar member 34 to a position of the other end. The supply bar shaft 34A is supported at least at one supply-bar supporting member 35. The supply bar shaft 34A constitutes a portion of the tension bar. At least one supply-bar supporting member 35 includes a first supporting member 35A and a second supporting member 35B. The first supporting member 35A supports the supply bar shaft 34A provided at a position of one end of the supply bar member 34. The second supporting member 35B supports the supply bar shaft 34A provided at a position of the other end of the supply bar member 34. The first supporting member 35A and the second supporting member 35B support the supply bar shaft 34A to support the supply bar member 34. The first supporting member 35A and the second supporting member 35B may each support the supply bar shaft 34A through a bearing that is not illustrated. The first supporting member 35A and the second supporting member 35B support the supply bar shaft 34A through the bearings, whereby the supply-bar supporting member 35 rotatably supports the supply bar member 34. The supply-bar supporting member 35 may support the supply bar member 34 in a manner such that the supply bar member 34 cannot rotate. The first supporting member 35A corresponds to one example of a first arm. The second supporting member 35B corresponds to one example of a second arm. Note that the supply bar shaft 34A may not be provided.

The supply-bar driving mechanism 36 includes a supply-bar driving source. In FIG. 2, the supply-bar driving source includes a first supply-bar driving source 36A and a second supply-bar driving source 36B. The first supply-bar driving source 36A and the second supply-bar driving source 36B are, for example, motors. A supply-bar driving current is applied to the first supply-bar driving source 36A and the second supply-bar driving source 36B with control by the controller 150 that will be described later. With the supply-bar driving current being applied, the first supply-bar driving source 36A and the second supply-bar driving source 36B generate driving force. In addition, the supply-bar driving mechanism 36 includes a first drive shaft 36C and a second drive shaft 36D. The first drive shaft 36C is coupled to the first supply-bar driving source 36A and the first supporting member 35A. The first drive shaft 36C transmits, to the first supporting member 35A, the driving force generated by the first supply-bar driving source 36A. With the driving force that has been transmitted, the first supporting member 35A rotates with the first drive shaft 36C being the center. The second drive shaft 36D is coupled to the second supply-bar driving source 36B and the second supporting member 35B. The second drive shaft 36D transmits, to the second supporting member 35B, the driving force generated by the second supply-bar driving source 36B. With the driving force that has been transmitted, the second supporting member 35B rotates with the second drive shaft 36D being the center. The first supply-bar driving source 36A and the second supply-bar driving source 36B correspond to examples of a driving portion and a second driving portion, respectively. In addition, the driving force generated by the second supply-bar driving source 36B corresponds to one example of second driving force.

The supply-bar driving mechanism 36 may be comprised of only either of the first supply-bar driving source 36A or the second supply-bar driving source 36B. However, it is desirable that the supply-bar driving mechanism 36 is comprised of the first supply-bar driving source 36A and the second supply-bar driving source 36B. When the supply-bar driving mechanism 36 includes the first supply-bar driving source 36A and the second supply-bar driving source 36B, the controller 150 controls the first supply-bar driving source 36A and the second supply-bar driving source 36B. Specifically, the controller 150 controls the first supply-bar driving source 36A and the second supply-bar driving source 36B such that the driving force from the second supply-bar driving source 36B is equal to the driving force from the first supply-bar driving source 36A.

As described above, the transport device includes the first supply-bar driving source 36A configured to provide driving force to the first supporting member 35A and the second supply-bar driving source 36B configured to provide driving force to the second supporting member 35B. The supply-bar supporting member 35 includes the supply bar member 34 around which the medium M is wrapped, the first supporting member 35A that supports one end of the supply bar member 34, and the second supporting member 35B that supports the other end of the supply bar member 34. The controlling unit 50 controls the first supply-bar driving source 36A and the second supply-bar driving source 36B such that the driving force that the second supply-bar driving source 36B provides is equal to the driving force that the first supply-bar driving source 36A provides.

At the time of transporting the medium M having a wide width, the transport device is able to transport it in a way that skewing or meandering is suppressed. For example, the transport device is able to transport the medium M while preventing skewing or meandering due to twisting of the second supporting member 35B relative to the first supporting member 35A.

The winding unit 40 includes a winding member 41, a winding-member driving mechanism 42, a guide bar member 43, a winding guide member 44, a guide-bar supporting member 46, and a guide-bar driving mechanism 49. The winding unit 40 winds the medium M on which printing is performed by the printing unit 20.

The winding member 41 is able to wind, around the roll core 71, the medium M on which printing has been performed. The roll core 71 is provided at the winding member 41, and winds the medium M. The winding member 41 is disposed downstream of the transport roller pair 24 in a direction in which the medium M is transported. The winding member 41 is able to rotate with a winding member rotary shaft, which is not illustrated, being the center. The winding member 41 supports a printing medium roll 70, and the medium M on which printing has been performed by the printing unit 20 is wound around the printing medium roll 70. The printing medium roll 70 in FIG. 1 is illustrated as an imaginary state in which the medium M has been wound. The winding member 41 is rotatably supported at a frame or the like that is not illustrated and is disposed at an end portion of the winding unit 40 at the +Y direction and an end portion at the −Y direction. The winding member 41 corresponds to one example of a winding unit.

The winding-member driving mechanism 42 causes the winding member 41 to rotate on the basis of control by the controlling unit 50. The winding-member driving mechanism 42 includes a drive source such as a motor that is not illustrated, a transmission mechanism configured to transmit driving force from the drive source, and a control circuit configured to operate the drive source on the basis of a signal from the controlling unit 50. By causing the winding member 41 to rotate, the winding-member driving mechanism 42 causes the winding member 41 to wind the medium M to form the printing medium roll 70. As the medium M is wound, the roll diameter of the printing medium roll 70 increases. The roll diameter represents a diameter.

The printed surface of the medium M on which printing has been performed by the printing head 26 is wrapped around the guide bar member 43. The guide bar member 43 is disposed between the transport roller pair 24 and the winding member 41 in a transport path through which the medium M is transported. The guide bar member 43 is in contact with the printed surface directly or through a cover member that is not illustrated. The cover member is, for example, a friction member configured to provide the medium M with a frictional force. That is, the guide bar member 43 is able to come into contact with the printed surface directly or indirectly. The guide bar member 43 applies tension to the medium M. The guide bar member 43 has any shape as long as it can apply tension to the medium M. However, the guide bar member 43 is desirable to have a tubular shape or cylindrical shape extending in a direction along the Y-axis. The guide bar member 43 uses an extruded member made of a metal material such as aluminum or SUS or a member obtained by shaping a pipe made of a metal material such as aluminum or SUS. The guide bar member 43 corresponds to one example of a tension bar.

Guide-bar supporting members 46 are disposed at a position at the +Y direction relative to the guide bar member 43 and a position at the −Y direction with the guide bar member 43 being interposed between the guide-bar supporting members 46. The guide-bar supporting members 46 supports the guide bar member 43 in a movable manner. The guide bar member 43 and the guide-bar supporting member 46 corresponds to one example of a second tension applying unit.

The guide-bar driving mechanism 49 provides driving force to the guide-bar supporting member 46 on the basis of control by the controlling unit 50. The guide-bar driving mechanism 49 includes a guide-bar driving source that is not illustrated and generates the driving force. As the medium M is transported in a state where the driving force is being provided, the guide-bar supporting members 46 and the guide bar member 43 supported by the guide-bar supporting members 46 swing. In a case of FIG. 1, the guide-bar driving mechanism 49 causes the guide-bar supporting member 46 and the guide bar member 43 supported by the guide-bar supporting member 46 to swing with an imaginary guide-bar swing shaft that is not illustrated being the center. That is, the guide-bar driving mechanism 49 is able to adjust biasing force used for the guide bar member 43 to bias the medium M. The guide-bar swing shaft does not match a rotary shaft, which is not illustrated, of the winding member 41. The guide-bar swing shaft may match the rotary shaft of the winding member 41. By adjusting the driving force provided to the guide-bar supporting member 46, the guide-bar driving mechanism 49 adjusts tension applied to the medium M in association with the swing of the supply bar member 34. The guide-bar driving mechanism 49 adjusts the tension acting at a portion of the medium M that extends from the transport roller pair 24 to the printing medium roll 70. The guide-bar driving mechanism 49 corresponds to one example of a third driving portion. The guide-bar driving mechanism 49 illustrated in FIG. 1 causes the guide-bar supporting member 46 and the guide bar member 43 to swing. However, the configuration thereof is not limited to this. The guide-bar driving mechanism 49 may cause the guide-bar supporting member 46 and the guide bar member 43 to perform translational movement along an axis parallel to the Z-axis. The trace of the guide-bar supporting member 46 and the guide bar member 43 at the time of the translational movement is not limited to the axis parallel to the Z-axis, and may be changed on an as-necessary basis so as to match the path of the medium M.

The printer 10 transports, through the following transport path, the medium M delivered from the medium roll 60 supported at the medium-roll supporting shaft 31. The medium M delivered from the medium roll 60 passes through the supply guide member 33 and the supply bar member 34, and is transported to the printing unit 20. The printing unit 20 uses the supply guide frame 21, the transport roller pair 24, the platen 25, and the ejection guide frame 29 to transport the medium M to the winding unit 40. The winding unit 40 winds the medium M that has passed through the guide bar member 43 and the winding guide member 44, around the printing medium roll 70 supported by the winding member 41. A unit including the medium-roll supporting shaft 31, the supply bar member 34, the supply-bar supporting member 35, the supply-bar driving mechanism 36, and the transport roller pair 24 corresponds to one example of a transport device. In addition, a unit including the transport roller pair 24, the guide bar member 43, the guide-bar supporting member 46, the guide-bar driving mechanism 49, and the winding member 41 corresponds to one example of a transport device.

Figure 3:
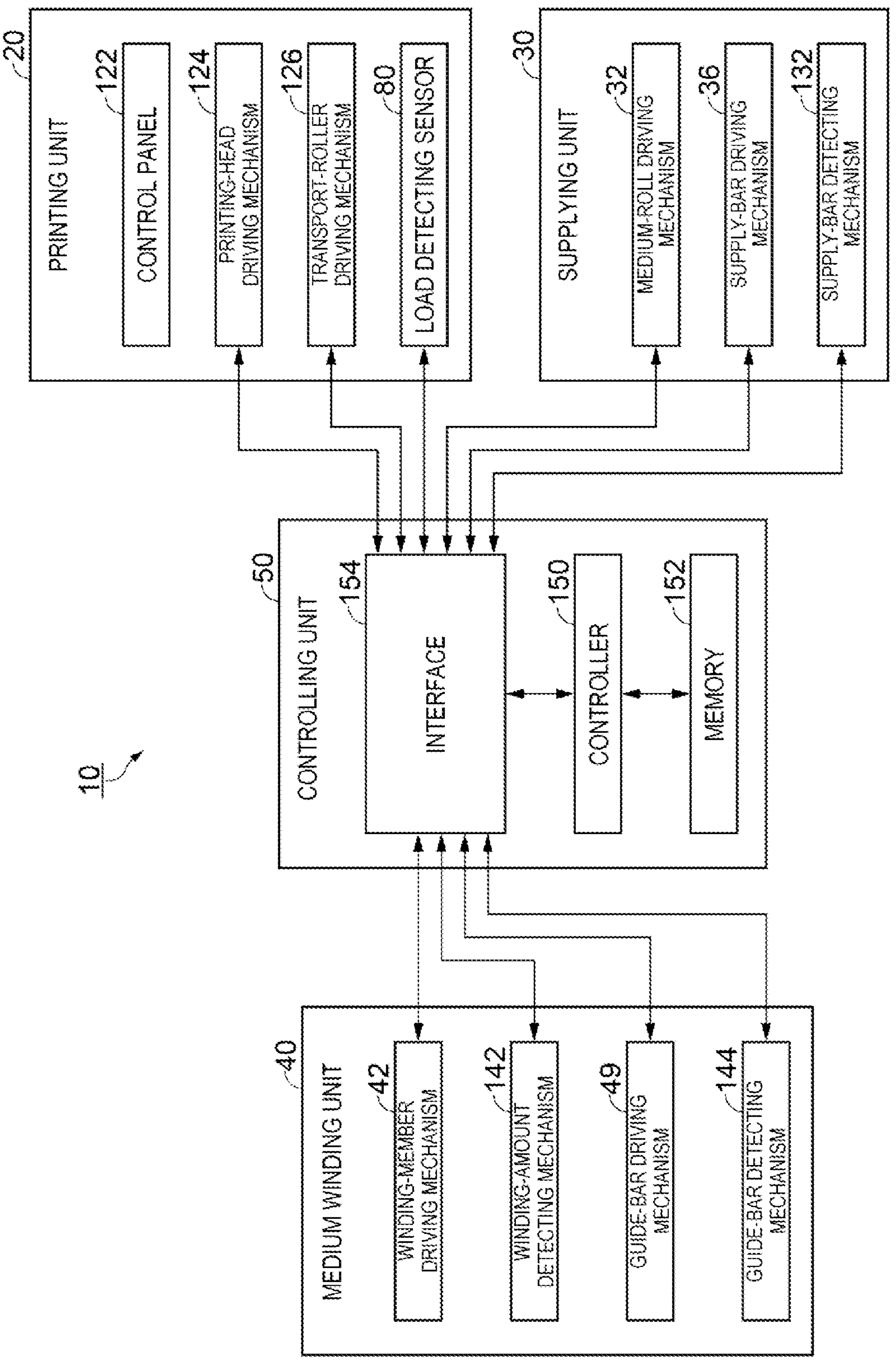
FIG. 3 is a diagram illustrating functional blocks of the printer.

FIG. 3 illustrates functional blocks of the printer 10. FIG. 3 illustrates functional portions concerning drive control used to drive the printer 10.

The printing unit 20 includes a control panel 122, a printing-head driving mechanism 124, the transport-roller driving mechanism 126, and the load detecting sensor 80. The control panel 122 receives input from a user. The control panel 122 corresponds to one example of a receiving portion. The user uses the control panel 122 to input various settings concerning printing. The settings concerning printing include, for example, the size of the medium M, the type of the medium M, the thickness of the medium M, the printing resolution, the printing mode, and the like. The size of the medium M, the type of the medium M, and the thickness of the medium M correspond to one example of a type of the medium. The functional portion that receives input from the user is not limited to the control panel 122. The communication interface configured to receive data from an external device such as a computer may serve as the functional portion that receives input from a user. The user transmits, to the printer 10, settings concerning printing and inputted into the external device. The printer 10 receives, at the communication interface, the settings concerning printing.

The printing-head driving mechanism 124 controls the printing head 26 and the carriage 27. The printing-head driving mechanism 124 causes the printing head 26 to discharge ink with control by the controlling unit 50. The printing-head driving mechanism 124 causes the carriage 27 to move with the control by the controlling unit 50.

The transport-roller driving mechanism 126 causes the transport roller pair 24 to operate. The transport-roller driving mechanism 126 causes at least either one of the first transport roller 22 and the second transport roller 23 to drive with control by the controlling unit 50. The transport-roller driving mechanism 126 causes the transport roller pair 24 to perform intermittent transport in which a transport operation and a stop operation are alternately performed. The transport operation is an operation in which the transport roller pair 24 transports the medium M by a predetermined amount. The transport operation corresponds to one example of a medium transport operation. The stop operation is an operation in which the transport roller pair 24 is stopped to stop transporting the medium M. The stop operation corresponds to one example of a medium stop operation.

The supplying unit 30 includes the medium-roll driving mechanism 32, the supply-bar driving mechanism 36, and a supply-bar detecting mechanism 132. The supply-bar detecting mechanism 132 detects a position of the supply bar member 34. As illustrated in FIG. 1, when the supply-bar supporting member 35 that supports the supply bar member 34 swings with a supply-bar supporting shaft being the center, the supply-bar detecting mechanism 132 detects the swing angle of the supply-bar supporting member 35. By detecting the swing angle of the supply-bar supporting member 35, the supply-bar detecting mechanism 132 is able to calculate the position of the supply bar member 34. The supply-bar detecting mechanism 132 is not limited to a mechanism configured to detect the swing angle of the supply-bar supporting member 35. The supply-bar detecting mechanism 132 may be, for example, a sensor configured to directly detect the position of the supply bar member 34.

The winding unit 40 includes the winding-member driving mechanism 42, a winding-amount detecting mechanism 142, the guide-bar driving mechanism 49, and a guide-bar detecting mechanism 144.

The winding-amount detecting mechanism 142 detects the amount of winding of the medium M wound around the roll core 71. The amount of winding of the medium M relates to the roll diameter of the printing medium roll 70. The winding-amount detecting mechanism 142 is, for example, a sensor configured to detect the roll diameter of the printing medium roll 70. The winding-amount detecting mechanism 142 may calculate the amount of winding of the medium M on the basis of the cumulative value of the length of the medium M that has been transported by the transport roller pair 24 and the rotational angle of the printing medium roll 70. The rotational angle of the printing medium roll 70 may be detected by a rotary encoder that is not illustrated. The amount of winding detected by the winding-amount detecting mechanism 142 is transmitted to the controlling unit 50. The controlling unit 50 controls the guide-bar driving mechanism 49 on the basis of the received amount of winding to adjust the tension acting at the medium M from the transport roller pair 24 and the winding member 41.

The guide-bar detecting mechanism 144 detects the position of the guide bar member 43. As illustrated in FIG. 1, when the guide-bar supporting member 46 that supports the guide bar member 43 swings with the guide-bar swing shaft being the center, the guide-bar detecting mechanism 144 detects the swing angle of the guide-bar supporting member 46. By detecting the swing angle of the guide-bar supporting member 46, the guide-bar detecting mechanism 144 is able to calculate the position of the guide bar member 43. The guide-bar detecting mechanism 144 is not limited to the mechanism configured to detect the swing angle of the guide-bar supporting member 46. The guide-bar detecting mechanism 144 may be, for example, a sensor configured to directly detect the position of the guide bar member 43.

The controlling unit 50 includes the controller 150, a memory 152, and an interface 154. The controller 150 includes a central processing unit (CPU) and a processor. The controller 150 controls drive of the printing-head driving mechanism 124, the transport-roller driving mechanism 126, the medium-roll driving mechanism 32, the winding-member driving mechanism 42, and the guide-bar driving mechanism 49. The controller 150 outputs a signal used to control the drive. The controller 150 performs control on the basis of various types of information transmitted from the load detecting sensor 80, the supply-bar detecting mechanism 132, the winding-amount detecting mechanism 142, and the guide-bar detecting mechanism 144.

The memory 152 includes a semiconductor memory such as a read only memory (ROM) and a random access memory (RAM), and a storage such as a hard disk drive (HDD). The memory 152 stores various types of programs that operate in the controller 150. The memory 152 stores information transmitted from various types of detection mechanisms.

The interface 154 couples various types of drive mechanisms and the detection mechanisms. The interface 154 transmits a signal outputted from the controller 150 and used to control the drive, to a drive mechanism serving as a control target. The interface 154 transmits, to the controller 150, information transmitted from various types of detection mechanisms.

2. Control of Supplying and Transporting Medium M

First Embodiment

Figure 4:
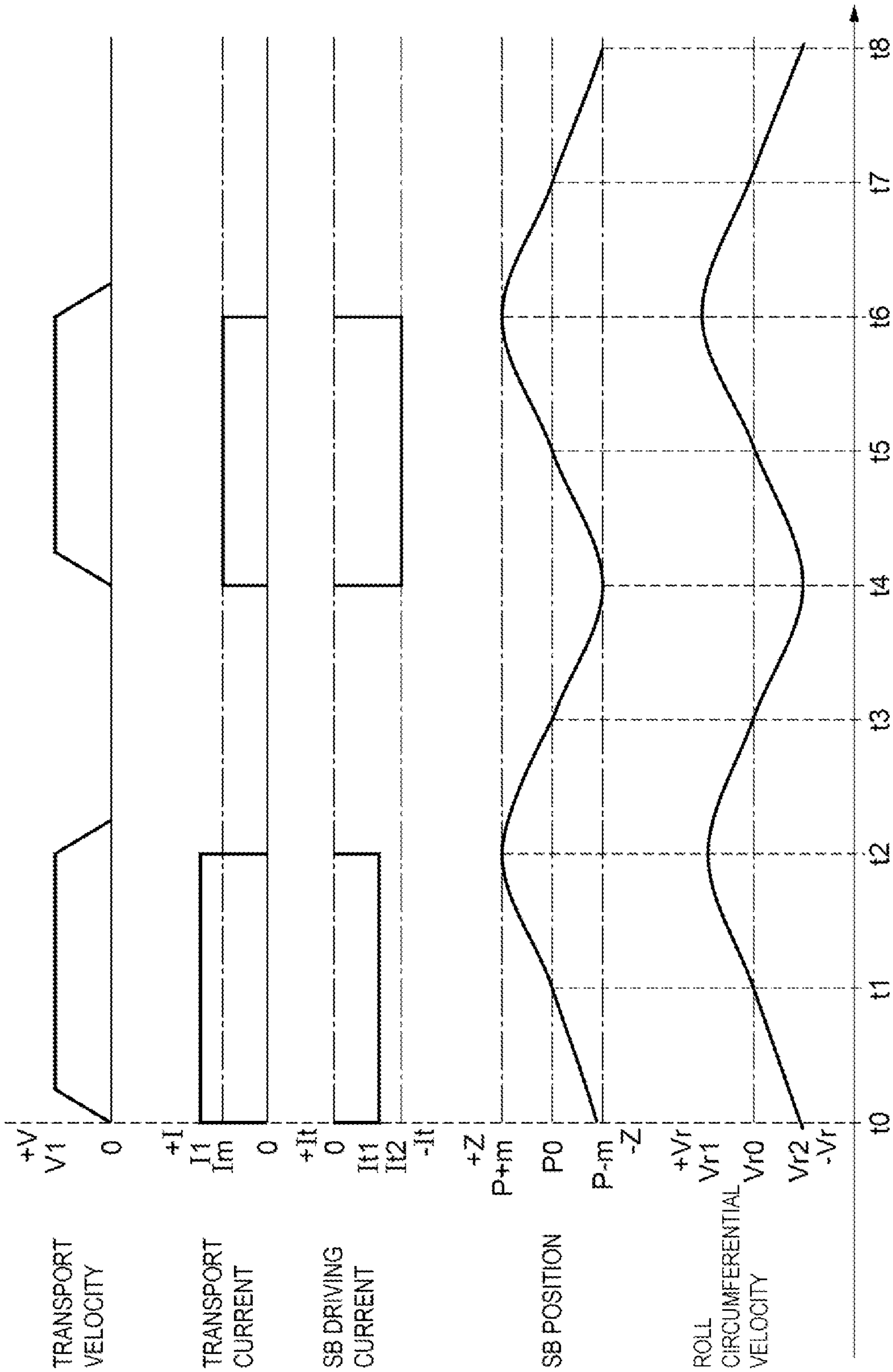
FIG. 4 is a diagram illustrating an operation of a supplying unit at a time of transporting a medium.

FIG. 4 illustrates operation according to a first embodiment when the printer 10 transports the medium M. FIG. 4 illustrates a change over time in the transport velocity, the transport current, the supply-bar driving current, the supply-bar position, and the roll circumferential velocity. In FIG. 4, the SB represents the supply bar member 34.

The transport velocity V is a velocity at which the medium M moves when the transport roller pair 24 transports the medium M. In FIG. 4, the transport velocity when the medium M is at rest is indicated as "0". In FIG. 4, the "+V" indicates the transport velocity when the transport roller pair 24 transports the medium M along the transport path from the supplying unit 30 to the winding unit 40.

The transport current is a current applied to the drive source included in the transport-roller driving mechanism 126 when the transport roller pair 24 transports the medium M. The transport current is detected by the load detecting sensor 80. The transport current indicates a transport load applied to the transport roller pair 24 when the printer 10 transports the medium M at a desired transport velocity. The transport load applied to the transport roller pair 24 corresponds to one example of a load applied to the transport unit. In FIG. 4, the "+I" represents a transport current when the transport roller pair 24 transports the medium M.

FIG. 4 illustrates the target current Im. The target current Im represents a target value of the transport current applied to the drive source included in the transport-roller driving mechanism 126 when the transport roller pair 24 transports the medium M. The target current Im is set in advance for each type of the medium M including the size of the medium M, the type of the medium M, the thickness of the medium M, and the like, and is stored in the memory 152. The controller 150 receives the transport current that the load detecting sensor 80 detects. The controller 150 compares the received transport current with the target current Im that the memory 152 stores. When the received transport current is greater than the target current Im, the controller 150 determines that an excessive load acts at the transport roller pair 24 due to the tension of the medium M. When the received transport current is smaller than the target current Im, the controller 150 determines that the load applied to the transport roller pair 24 due to the tension of the medium M is insufficient.

The supply-bar driving current is a current applied at the drive source included in the supply-bar driving mechanism 36 when the supply bar member 34 applies tension to the medium M. In FIG. 4, the "+It" represents the supply-bar driving current applied to the supply-bar driving source when the supply bar member 34 increases the tension to the medium M. The supply-bar driving source will be described later and is included in the supply-bar driving mechanism 36. In FIG. 4, the "−It" represents the supply-bar driving current applied to the supply-bar driving source when the supply bar member 34 reduces the tension to the medium M. By driving the supply-bar supporting member 35, the supply-bar driving mechanism 36 adjusts the tension that the supply bar member 34 applies to the medium M. In the present embodiment, in order to compensate for the excessive biasing force, that is, the excessive tension resulting from the weight of the supply bar member 34 itself, the supply-bar driving current applied is a negative current. That is, by adjusting the supply-bar driving current It, the controller 150 is able to control the biasing force used for the supply bar member 34 to bias the medium M. Note that, when the weight of the supply bar member 34 is light, the supply-bar driving current applied may be a positive current.

The supply-bar position represents the position of the supply bar member 34. With the swing of the supply-bar supporting member 35, the supply bar member 34 moves in the +Z direction and the −Z direction. In FIG. 4, the position of the supply bar member 34 when the supply-bar supporting member 35 is positioned at the swing center is indicated as the swing center position P0. In the present embodiment, when the supply-bar supporting member 35 is in the posture along the axis parallel to the X-axis, the supply bar member 34 is located at the swing center position P0. In FIG. 4, the +Z position represents a position of the supply bar member 34 when it is located at a position further toward the +Z direction than the swing center position P0. In FIG. 4, the −Z position represents a position of the supply bar member 34 when it is located at a position further toward the −Z direction than the swing center position P0.

The roll circumferential velocity represents a circumferential velocity of the medium roll 60. The medium-roll driving mechanism 32 adjusts the circumferential velocity of the medium roll 60 with control by the controller 150. The circumferential velocity of the medium roll 60 is associates with the amount of transport of the medium M delivered from the medium roll 60. The amount of transport of the medium M delivered from the medium roll 60 is associated with tension of the medium M between the medium roll 60 and the transport roller pair 24. In FIG. 4, the circumferential velocity that has been set in advance is indicated as the reference circumferential velocity Vr0. The reference circumferential velocity Vr0 is stored in advance in the memory 152. In FIG. 4, the circumferential velocity greater than the reference circumferential velocity Vr0 is indicated as the +Vr. In FIG. 4, the circumferential velocity lower than the reference circumferential velocity Vr0 is indicated as the −Vr.

At the time t0, the controller 150 controls the transport-roller driving mechanism 126 to drive the transport roller pair 24. The transport-roller driving mechanism 126 applies, to the drive source included in the transport-roller driving mechanism 126, a transport current that causes the transport velocity of the medium M by the transport roller pair 24 to be the target transport velocity V1. In FIG. 4, the transport-roller driving mechanism 126 applies the transport current Il to the drive source.

The load detecting sensor 80 detects the transport current Il applied to the drive source. The controller 150 receives the transport current Il detected by the load detecting sensor 80.

At the time t0, the controller 150 controls the printing-head driving mechanism 124 to cause the printing head 26 to perform printing. The printing-head driving mechanism 124 causes the printing head 26 and the carriage 27 to drive to perform printing.

In addition, at the time t0, the controller 150 controls the supply-bar driving mechanism 36 to adjust the tension that the supply bar member 34 applies to the medium M. In FIG. 4, the controller 150 causes a supply-bar driving current It1 to be applied to the supply-bar driving source included in the supply-bar driving mechanism 36. For example, the supply-bar driving current It1 is applied to the supply-bar driving source in a manner such that feedback control is performed on the basis of the deviation between the target current Im and the actual transport current in the transport operation at and before the time t0, whereby biasing force that causes the transport current to approach the target current Im is applied to the medium M. FIG. 4 does not illustrate a graph concerning the transport operation at and before the time t0. The supply-bar driving source will be described later. By applying the supply-bar driving current It1, the supply-bar driving mechanism 36 causes the tension applied to the medium M by the supply bar member 34 to reduce.

Note that it may be possible to employ a configuration in which by measuring the eccentricity of the roll body in advance to create an eccentricity profile based on the way of eccentricity of the roll body, and performing feed forward control on the basis of the eccentricity profile, the supply-bar driving current It is applied to the supply-bar driving source so that the biasing force that makes the transport current close to the target current Im is provided to the medium M. In this case, the eccentricity profile is created on the basis of a change in the transport current applied to the drive source included in the transport-roller driving mechanism 126 relative to the change in the rotational angle of the roll body, in a state where the driving force from the medium-roll driving mechanism 32 is constant, and also in a state where the amount of transport of the medium M delivered from the medium roll 60 is constant for each transport operation.

Figure 5:
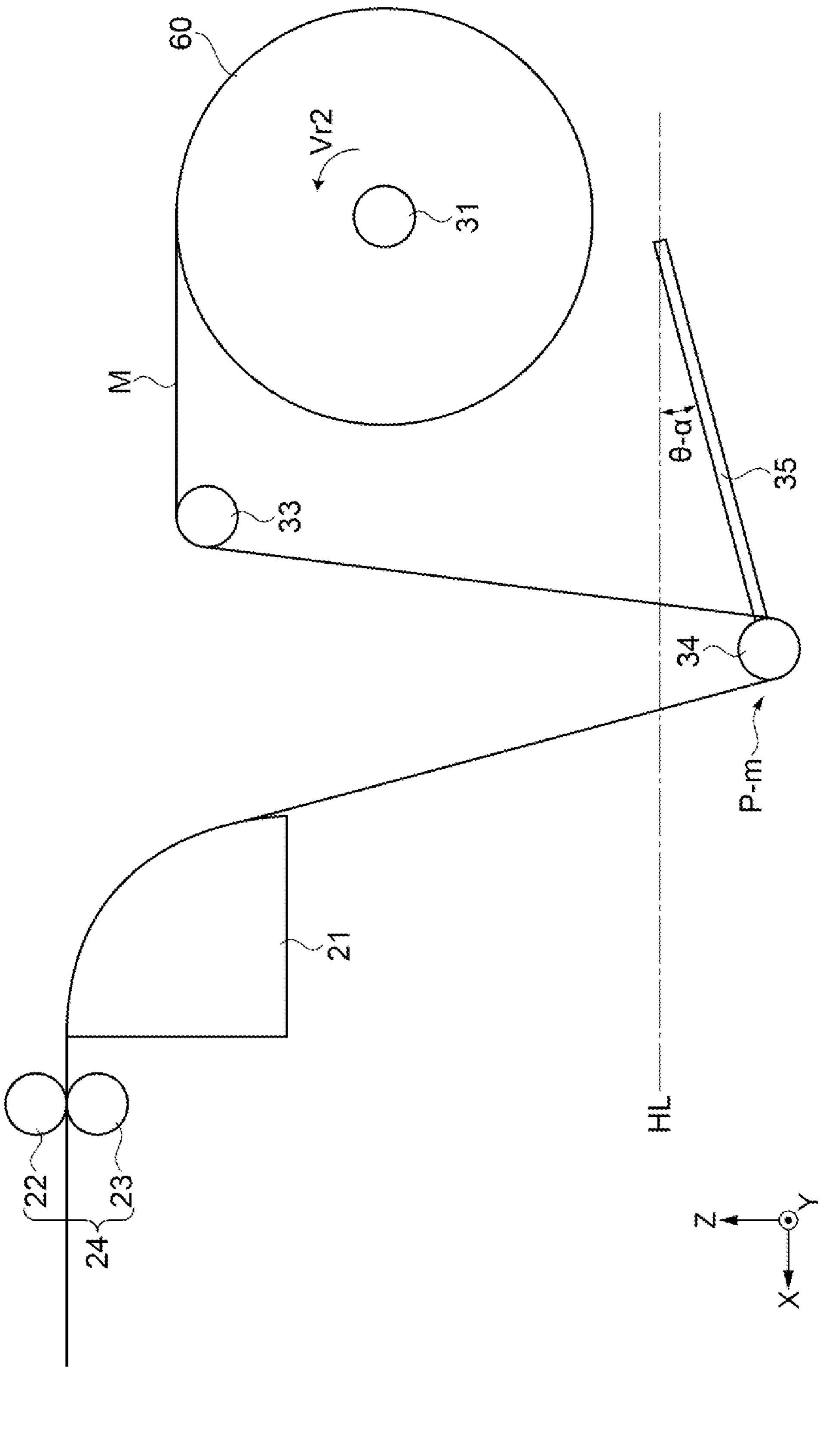
FIG. 5 is a diagram illustrating a position of a supply bar member.

FIG. 5 schematically illustrates a position of the supply bar member 34 at the time t0. FIG. 5 illustrates a horizontal line HL parallel to the X-axis passing through the supply-bar swing shaft that is not illustrated. In the present embodiment, the supply-bar supporting member 35 matches the horizontal line HL when it is located at the position of the swing center.

At the time t0, the supply-bar supporting member 35 swings at a swing angle $\theta-\alpha$ with the supply-bar swing shaft being the center. The supply bar member 34 is located at a lower limit position P−m. The medium roll 60 rotates with the roll circumferential velocity being the lower limit circumferential velocity Vr2. The transport roller pair 24 does not transport the medium M immediately before the time t0, and hence, the controller 150 controls the medium-roll driving mechanism 32 to reduce the roll circumferential velocity of the medium roll 60. The amount of transport of the medium M delivered from the medium roll 60 that rotates at the lower limit circumferential velocity Vr2 is smaller than the amount of transport of the medium M at the time when the printer 10 performs printing.

After the transport-roller driving mechanism 126 applies the transport current Il to the drive source, the transport velocity of the medium M increases to the target transport velocity V1. After the transport roller pair 24 reaches the target transport velocity V1, the transport of the medium M at the target transport velocity V1 continues.

After the transport roller pair 24 starts to transport the medium M, the position of the supply bar member 34 moves toward the +Z direction. As the transport roller pair 24 transports the medium M, the medium M moves the supply bar member 34 toward the +Z direction. At this time, with the drive by the supply-bar driving mechanism 36, the supply bar member 34 reduces the tension applied to the medium M.

Figure 6:
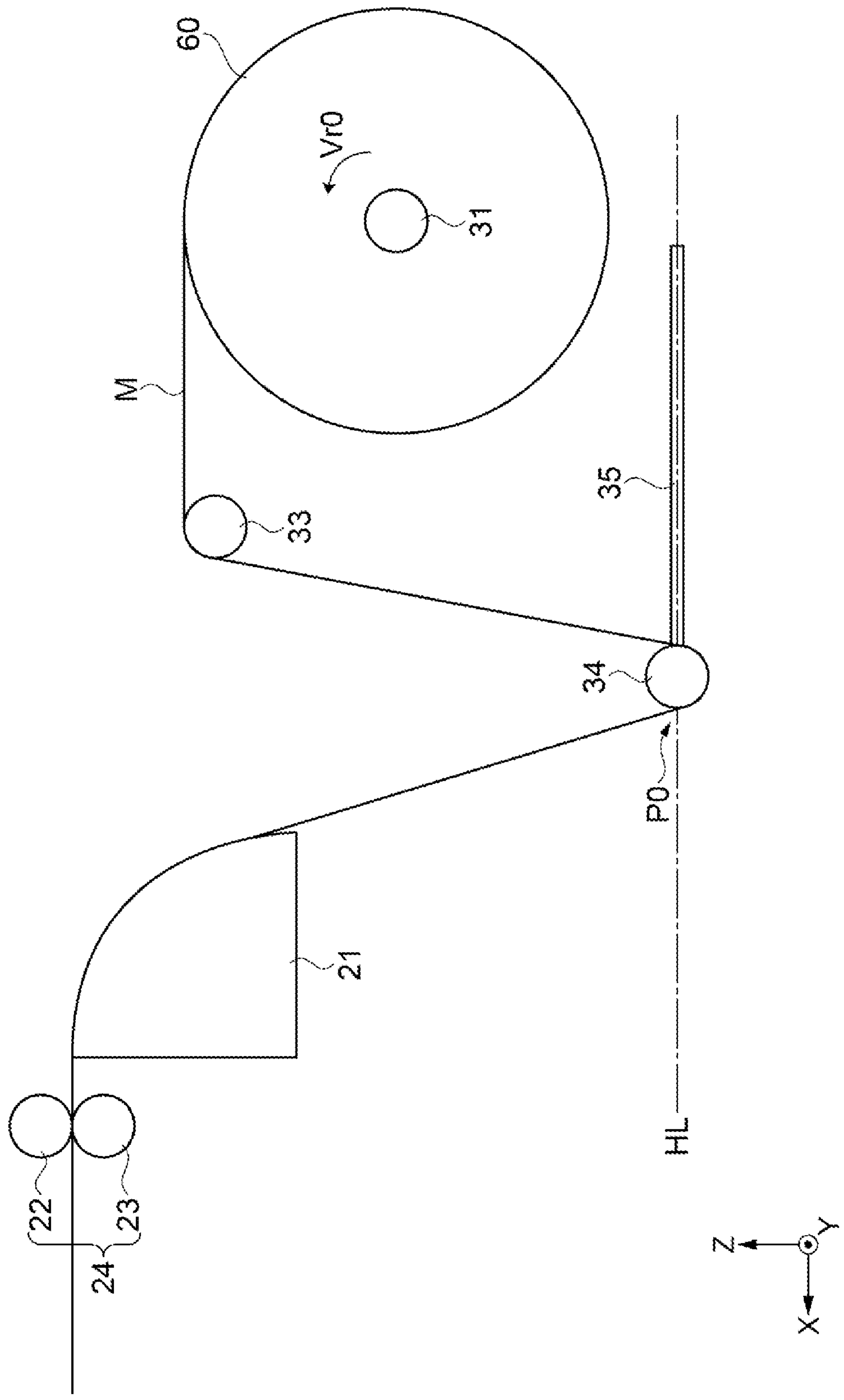
FIG. 6 is a diagram illustrating a position of the supply bar member.

At the time t1, the supply-bar supporting member 35 is located at a position of the swing center. At the time t1, the controller 150 continues to apply the transport current Il to the drive source included in the transport-roller driving mechanism 126. The controller 150 continues to apply the supply-bar driving current It1 to the supply-bar driving source included in the supply-bar driving mechanism 36. FIG. 6 schematically illustrates the position of the supply bar member 34 at the time t1.

At the time t1, the supply-bar supporting member 35 is located at a position along the horizontal line HL. The supply-bar supporting member 35 sits at a swing angle of 0°. The supply bar member 34 is located at the center position P0. The controller 150 controls the roll circumferential velocity of the medium roll 60 on the basis of the position of the supply bar member 34. From the time t0 to the time t1, the medium M raises the position of the supply bar member 34 from the lower limit position P−m to the center position P0. When the position of the supply bar member 34 moves toward the +Z direction, the controller 150 controls the supply-bar driving mechanism 36 to increase the roll circumferential velocity of the medium roll 60. At the time t1, the roll circumferential velocity of the medium roll 60 is a reference circumferential velocity Vr0.

Figure 7:
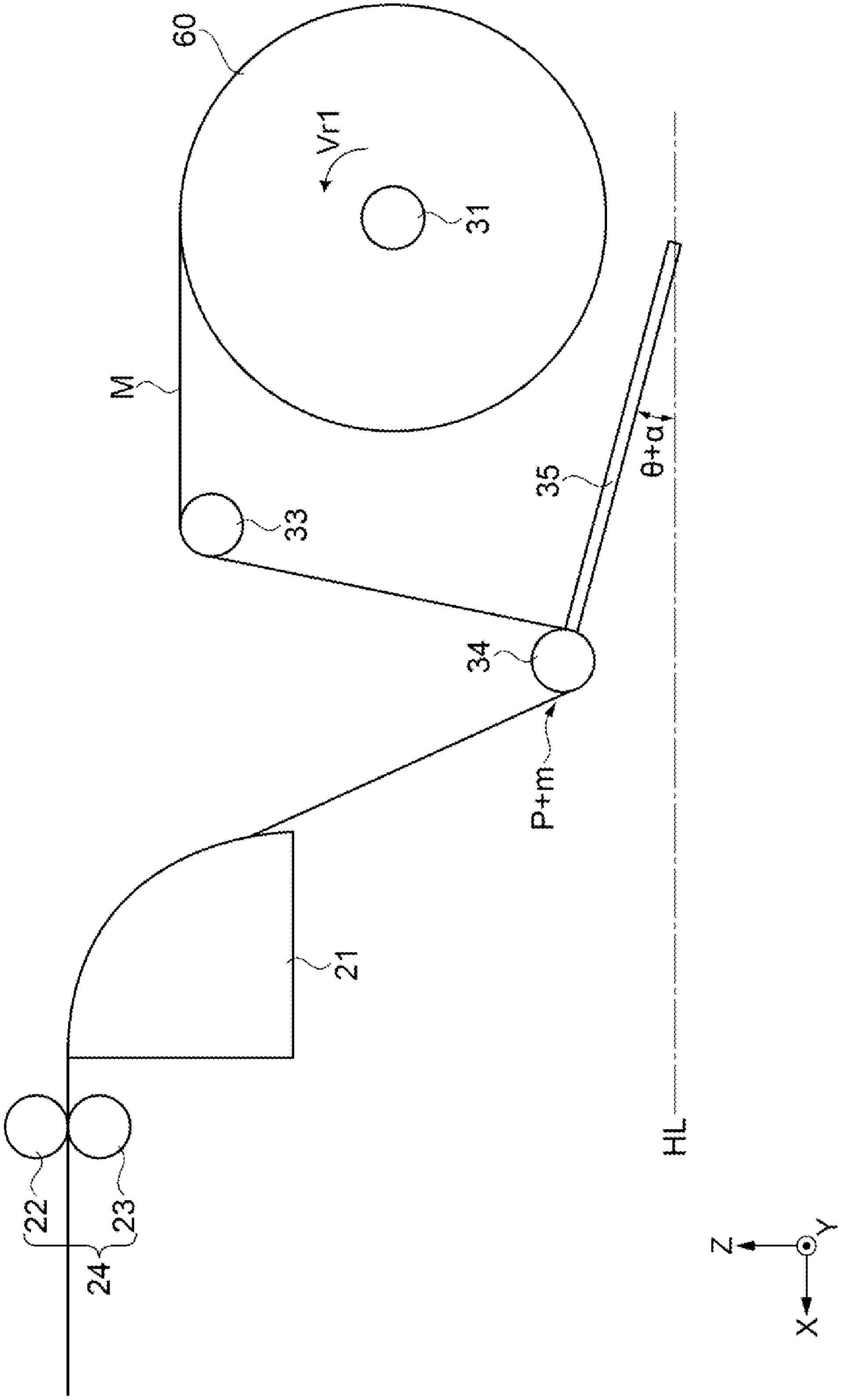
FIG. 7 is a diagram illustrating a position of the supply bar member.

At the time t2, the controller 150 stops applying the transport current Il to the drive source included in the transport-roller driving mechanism 126. At this time, the controller 150 stops applying the supply-bar driving current It1 to the supply-bar driving source included in the supply-bar driving mechanism 36. FIG. 7 schematically illustrates the position of the supply bar member 34 at the time t2.

At the time t2, the supply-bar supporting member 35 swings at a swing angle $\theta+\alpha$ with the supply-bar swing shaft being the center. The supply bar member 34 is located at the upper limit position P+m. From the time t0 to the time t2, the transport roller pair 24 continues to transport the medium M, which reduces the amount of medium M left in the transport path from the medium roll 60 to the transport roller pair 24. As the amount of medium M left in the transport path reduces, the supply bar member 34 moves toward the +Z direction. With the move of the supply bar member 34 toward the +Z direction, the length of the transport path of the medium M from the medium roll 60 to the transport roller pair 24 reduces. The controller 150 controls the medium-roll driving mechanism 32 to increase the roll circumferential velocity of the medium roll 60 from the time t0 to the time t2. Specifically, the controller 150 controls the medium-roll driving mechanism 32 such that the roll circumferential velocity of the medium roll 60 is the lower limit circumferential velocity Vr2 at the time t0, and is the upper limit circumferential velocity Vr1 at the time t2. By increasing the roll circumferential velocity of the medium roll 60, the controller 150 prevents the supply bar member 34 from moving toward the +Z direction and beyond the upper limit position P+m.

At the time t2, the controller 150 stops applying the supply-bar driving current It1 to the supply-bar driving source included in the supply-bar driving mechanism 36. As the controller 150 stops applying the supply-bar driving current It1, the tension that the supply bar member 34 applies to the medium M increases. By stopping the application of the supply-bar driving current It1, the supply bar member 34 applies tension to the medium M with its own weight.

At the time t2, the controller 150 controls the printing-head driving mechanism 124 to stop printing by the printing head 26. By driving the carriage 27, the printing-head driving mechanism 124 causes the printing head 26 to move to a maintenance unit that is not illustrated.

From the time t2 to the time t4, the transport roller pair 24 stops transporting the medium M. On the other hand, the controller 150 controls the medium-roll driving mechanism 32 to keep the medium roll 60 rotating. As the medium roll 60 is kept rotating, the medium M is delivered from the medium roll 60 into the transport path. With the medium M being delivered into the transport path, the amount of the medium M in the transport path from the medium roll 60 to the transport roller pair 24 increases. With an increase in the amount of the medium M, the position of the supply bar member 34 moves toward the −Z direction.

At the time t3, the supply bar member 34 is located at the center position P0 illustrated in FIG. 6. The controller 150 controls the circumferential velocity of the medium roll 60 to be the reference circumferential velocity Vr0, on the basis of the position of the supply bar member 34.

From the time t2 to the time t4, the controller 150 controls the medium-roll driving mechanism 32 to reduce the roll circumferential velocity of the medium roll 60. Specifically, the controller 150 controls the medium-roll driving mechanism 32 such that the roll circumferential velocity of the medium roll 60 is the upper limit circumferential velocity Vr1 at the time t2, and is the lower limit circumferential velocity Vr2 at the time t4. The controller 150 reduces the roll circumferential velocity, which reduces the amount of supply of the medium M delivered into the transport path from the medium roll 60 to the transport roller pair 24. With the reduction in the amount of supply of the medium M, it is possible to prevent the supply bar member 34 from moving toward the −Z direction beyond the lower limit position P−m.

From the time t2 to the time t4, the controller 150 calculates the supply-bar driving current. The controller 150 calculates the supply-bar driving current on the basis of the transport current detected by the load detecting sensor 80, that is, the actual transport current and the target current Im stored in the memory 152. For example, from the time t2 to the time t4, feedback control is performed on the basis of the deviation between the target current Im and the actual transport current. With this configuration, the controller 150 calculates a value of the supply-bar driving current that causes the medium M to be provided biasing force that makes the transport current close to the target current Im in the next transport operation, that is, from the time t4 to the time t6. The supply-bar driving current calculated from the time t2 to the time t4 is a supply-bar driving current It2 that will be described later.

Note that the supply-bar driving current may be calculated at any time from the time t0 to the time t2. For example, it may be possible to employ a configuration in which detection of the transport current by the load detecting sensor 80 ends at the time t1, and the supply-bar driving current is calculated from the time t1 to the time t2.

For example, when the detected transport current is greater than the target current Im, the controller 150 determines that the load applied to the transport roller pair 24 is greater than targeted. When the load is determined to be greater than targeted, the controller 150 reduces the supply-bar driving current. By reducing the supply-bar driving current, the tension that the supply bar member 34 applies to the medium M reduces. With the reduction in the tension applied to the medium M, the load applied to the transport roller pair 24 reduces.

When the detected transport current is smaller than the target current Im, the controller 150 determines that the load applied to the transport roller pair 24 is smaller than targeted. When the load is determined to be smaller than targeted, the controller 150 increases the supply-bar driving current. By increasing the supply-bar driving current, the tension that the supply bar member 34 applies to the medium M increases. With the increase in the tension applied to the medium M, the load applied to the transport roller pair 24 increases.

The controller 150 may correct the supply-bar driving current in accordance with types of the medium M including the size of the medium M, the type of the medium M, the thickness of the medium M, and the like. For example, when the medium M is thin paper, the controller 150 sets a supply-bar driving current smaller than that when the medium M is a standard sheet. With the reduction in the supply-bar driving current, the driving force generated at the supply-bar driving source included in the supply-bar driving mechanism 36 reduces. With the reduction in the driving force, the tension that the supply bar member 34 applies to the medium M reduces, which makes the medium M less likely to break.

The transport device includes the control panel 122 configured to receive input concerning the type of the medium M. The controlling unit 50 corrects the driving force by the supply-bar driving mechanism 36 in accordance with the type of the medium M received at the control panel 122.

The transport device is able to suppress a reduction in the accuracy of the transport amount associated with the type of the medium M. The medium adaptability of the transport device improves.

At the time t4, the controller 150 controls the transport-roller driving mechanism 126 to cause the transport roller pair 24 to drive. The transport-roller driving mechanism 126 applies, to the drive source included in the transport-roller driving mechanism 126, a transport current that causes the transport velocity of the medium M by the transport roller pair 24 to be the target transport velocity V1. In addition, the controller 150 applies the supply-bar driving current It2 to the supply-bar driving source included in the supply-bar driving mechanism 36. The supply-bar driving current It2 is a value smaller than that of the supply-bar driving current It1.

After the transport current and the supply-bar driving current are applied, the load detecting sensor 80 detects the transport current. In FIG. 4, the transport current applied matches the target current Im. The controller 150 adjusts the supply-bar driving current to reduce the load applied to the transport roller pair 24, whereby the transport current matches the target current Im. The controller 150 adjusts the load of the tension that the supply bar member 34 applies to the medium M, which makes it possible for the transport roller pair 24 to transport the medium M in an accurate manner.

From the time t4 to the time t6, the transport roller pair 24 transports the medium M. The printing head 26 and the carriage 27 are driven by the printing-head driving mechanism 124 to perform printing. At the time t5, the supply bar member 34 ascends from the lower limit position P−m illustrated in FIG. 5, and is located at the center position P0 illustrated in FIG. 6. The roll circumferential velocity of the medium roll 60 changes in accordance with the position of the supply bar member 34. The roll circumferential velocity of the medium roll 60 increases from the lower limit circumferential velocity Vr2 to the reference circumferential velocity Vr0.

At the time t6, the controller 150 stops transporting the medium M and also stops performing printing by the printing head 26. The transport current is switched from the target current Im to the current 0. The supply-bar driving current is switched from the supply-bar driving current It2 to the supply-bar driving current 0. The supply bar member 34 is located at the upper limit position P+m. The circumferential velocity of the medium roll 60 is controlled to be the upper limit circumferential velocity Vr1.

From the time t6 to the time t8, the controller 150 maintains the transport current 0 and the supply-bar driving current 0. The supply bar member 34 descends from the upper limit position P+m to the lower limit position P−m. The circumferential velocity of the medium roll 60 reduces from the upper limit circumferential velocity Vr1 to the lower limit circumferential velocity Vr2. The controller 150 receives the transport current for a period from the time t4 to the time t6, and compares the received transport current with the target current Im stored in the memory 152. On the basis of the result of the comparison, on and after the time t8, the controller 150 calculates the supply-bar driving current applied to the supply-bar driving source included in the supply-bar driving mechanism 36.

At the time t7 between the time t6 and the time t8, the supply bar member 34 is located at the center position P0. The roll circumferential velocity of the medium roll 60 is controlled to be the reference circumferential velocity Vr0.

At the time t8, the controller 150 controls the transport-roller driving mechanism 126 to drive the transport roller pair 24. The transport-roller driving mechanism 126 applies, to the drive source included in the transport-roller driving mechanism 126, a transport current that causes the transport velocity of the medium M by the transport roller pair 24 to be the target transport velocity V1. In addition, the controller 150 applies the supply-bar driving current It2 to the supply-bar driving source included in the supply-bar driving mechanism 36.

As described above, the transport device includes: the medium-roll supporting shaft 31 configured to rotatably hold the medium roll 60 in which the medium M is wound; the transport roller pair 24 configured to transport the medium M unwound from the medium roll 60; the supply bar member 34 and the supply-bar supporting member 35 configured such that the medium M is wrapped around between the medium-roll supporting shaft 31 and the transport roller pair 24 to apply tension to the medium M; the supply-bar driving mechanism 36 configured to provide driving force to the supply-bar supporting member 35; the controlling unit 50 configured to control the transport roller pair 24 and the supply-bar driving mechanism 36; and the load detecting sensor 80 configured to detect a load applied to the transport roller pair 24. The controlling unit 50 controls the driving force that the supply-bar driving mechanism 36 provides, to adjust the tension applied to the medium M. The controlling unit 50 controls the driving force by the supply-bar driving mechanism 36 on the basis of the load detected by the load detecting sensor 80.

In the transport device, the supply bar member 34 is provided between the medium-roll supporting shaft 31 and the transport roller pair 24, which makes it easy to eliminate the influence of inertia on the transport roller pair 24. The transport device uses the supply-bar driving mechanism 36 to perform control in response to the detected load, which makes it possible to perform control in a manner such that the influence of inertia of the medium roll 60 is reduced. The transport device is able to control the transport of the medium M in an accurate manner.

In addition, the printer 10 includes: the medium-roll supporting shaft 31 configured to rotatably hold the medium roll 60 in which the medium M is wound; the transport roller pair 24 configured to transport the medium M unwound from the medium roll 60; the printing head 26 configured to perform printing on the medium M transported by the transport roller pair 24; the supply bar member 34 and the supply-bar supporting member 35 configured such that the medium M is wrapped around between the medium-roll supporting shaft 31 and the transport roller pair 24 to apply tension to the medium M; the supply-bar driving mechanism 36 configured to provide driving force to the supply-bar supporting member 35; the controlling unit 50 configured to control the transport roller pair 24 and the supply-bar driving mechanism 36; and the load detecting sensor 80 configured to detect a load applied to the transport roller pair 24. The controlling unit 50 controls the driving force by the supply-bar driving mechanism 36, on the basis of the load detected by the load detecting sensor 80.

In the printer 10, the supply bar member 34 is provided between the medium-roll supporting shaft 31 and the transport roller pair 24, which makes it easy to eliminate the influence of inertia on the transport roller pair 24. The printer 10 uses the supply-bar driving mechanism 36 to perform control in response to the detected load, which makes it possible to perform control in a manner such that the influence of inertia of the medium roll 60 is reduced. The printer 10 is able to control the transport of the medium M in an accurate manner.

The transport controlling method for the transport device includes: transporting, by the transport roller pair 24, the medium M wound in the medium roll 60 held by the medium-roll supporting shaft 31; wrapping the medium M around the supply bar member 34 between the medium-roll supporting shaft 31 and the transport roller pair 24 to apply tension to the medium M by rotation of the supply-bar supporting member 35 configured to support the supply bar member 34; detecting a load applied to the transport roller pair 24; and controlling the supply-bar driving mechanism 36 configured to provide driving force to the supply-bar supporting member 35, on the basis of the detected load.

In the transport device, the supply bar member 34 is provided between the medium-roll supporting shaft 31 and the transport roller pair 24, which makes it easy to eliminate the influence of inertia on the transport roller pair 24. The transport device uses the supply-bar driving mechanism 36 to perform control in response to the detected load, which makes it possible to perform control in a manner such that the influence of inertia of the medium roll 60 is reduced. The transport device is able to control the transport of the medium M in an accurate manner.

Second Embodiment

Figure 8:
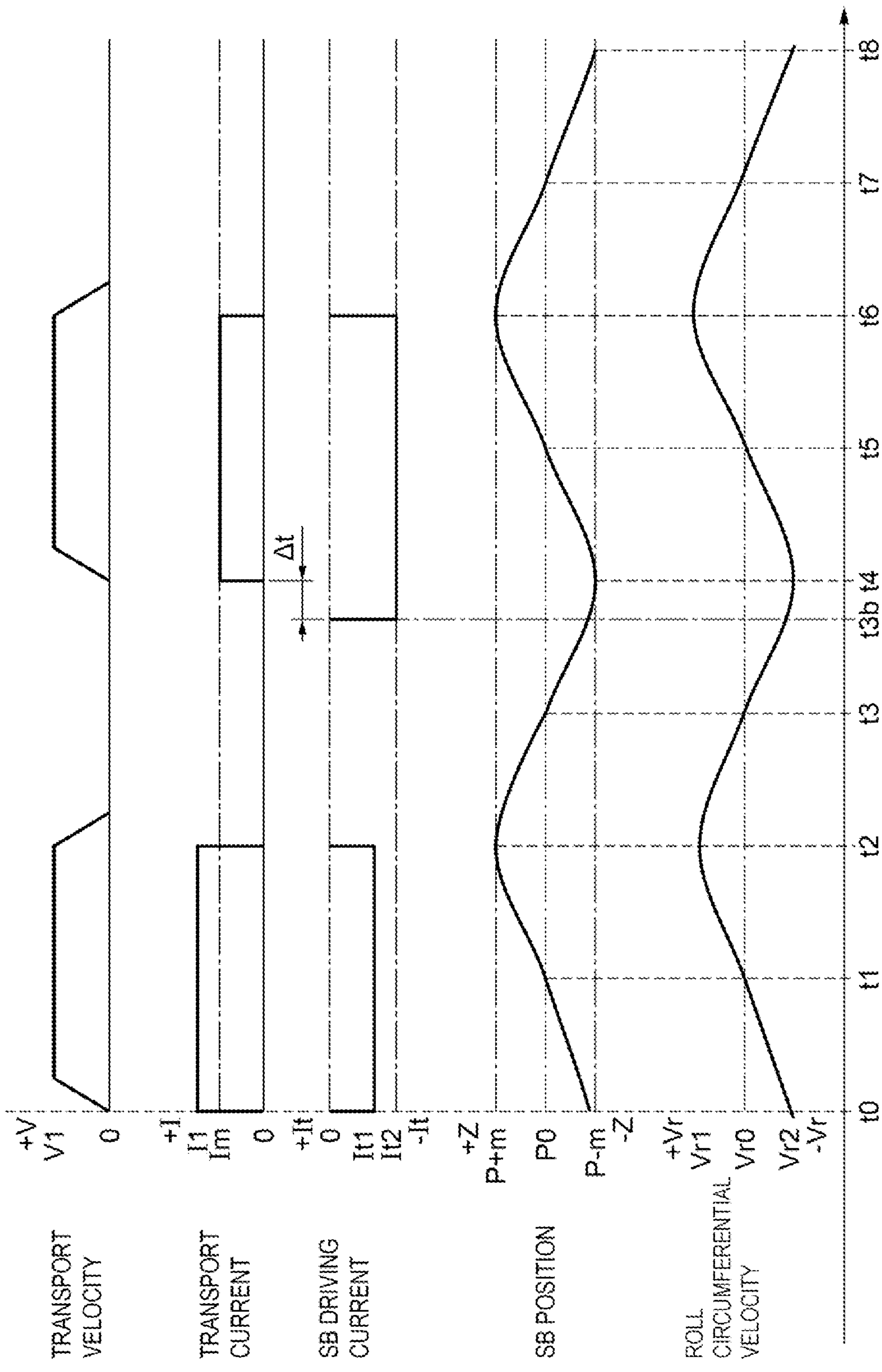
FIG. 8 is a diagram illustrating an operation of the supplying unit at a time of transporting a medium.

FIG. 8 illustrates an operation according to a second embodiment when the printer 10 transports the medium M. FIG. 8 illustrates a change over time in the transport velocity, the transport current, the supply-bar driving current, the supply-bar position, and the roll circumferential velocity. In FIG. 8, the SB represents a supply bar as with FIG. 4.

In the second embodiment, the timing at which the supply-bar driving current is applied differs from that described in the first embodiment. In the second embodiment, the operations other than the timing at which the supply-bar driving current is applied are the same as those in the first embodiment.

In the second embodiment, the application time t3*b* at which the supply-bar driving current is applied is provided between the time t3 and the time t4. The application time t3*b* is the time that is earlier than the time t4 by a difference time Δt. As the controller 150 sets the application time t3*b* as the time when the supply-bar driving current is applied, the tension that the supply bar member 34 applies to the medium M changes at the time t4. In a case of FIG. 8, at the time t4, the tension that has reduced as a result of application of the supply-bar driving current is applied to the medium M. The tension applied to the medium M by the supply bar member 34 before the start of the transport by the transport roller pair 24 is reduced. The printer 10 is able to reduce a load resulting from inertia of the supply bar member 34 and acting at the transport roller pair 24 at the start of transporting the medium M.

Note that the value of the supply-bar driving current from the application time t3*b* to the time t4 may be a value that varies depending on the feedback control or may be a constant value regardless of the feedback control.

As described in the second embodiment, the controlling unit 50 controls the transport roller pair 24 to alternately perform a medium transport operation in which the medium M is transported by a predetermined amount and a medium stop operation in which transporting the medium M is stopped. By controlling the supply-bar driving mechanism 36 at the time of performing the stop operation for the medium M, the tension applied to the medium M is reduced, and the operation in which the medium M is transported is performed again in a state where the tension is reduced.

The transport device is able to suppress a sudden increase in the load applied to the transport roller pair 24 at the time of starting the operation of transporting the medium M. The transport device is able to accurately control the amount of transport at the time of starting the operation of transporting the medium M.

3. Control of Winding and Transporting of Medium M

Figure 9:
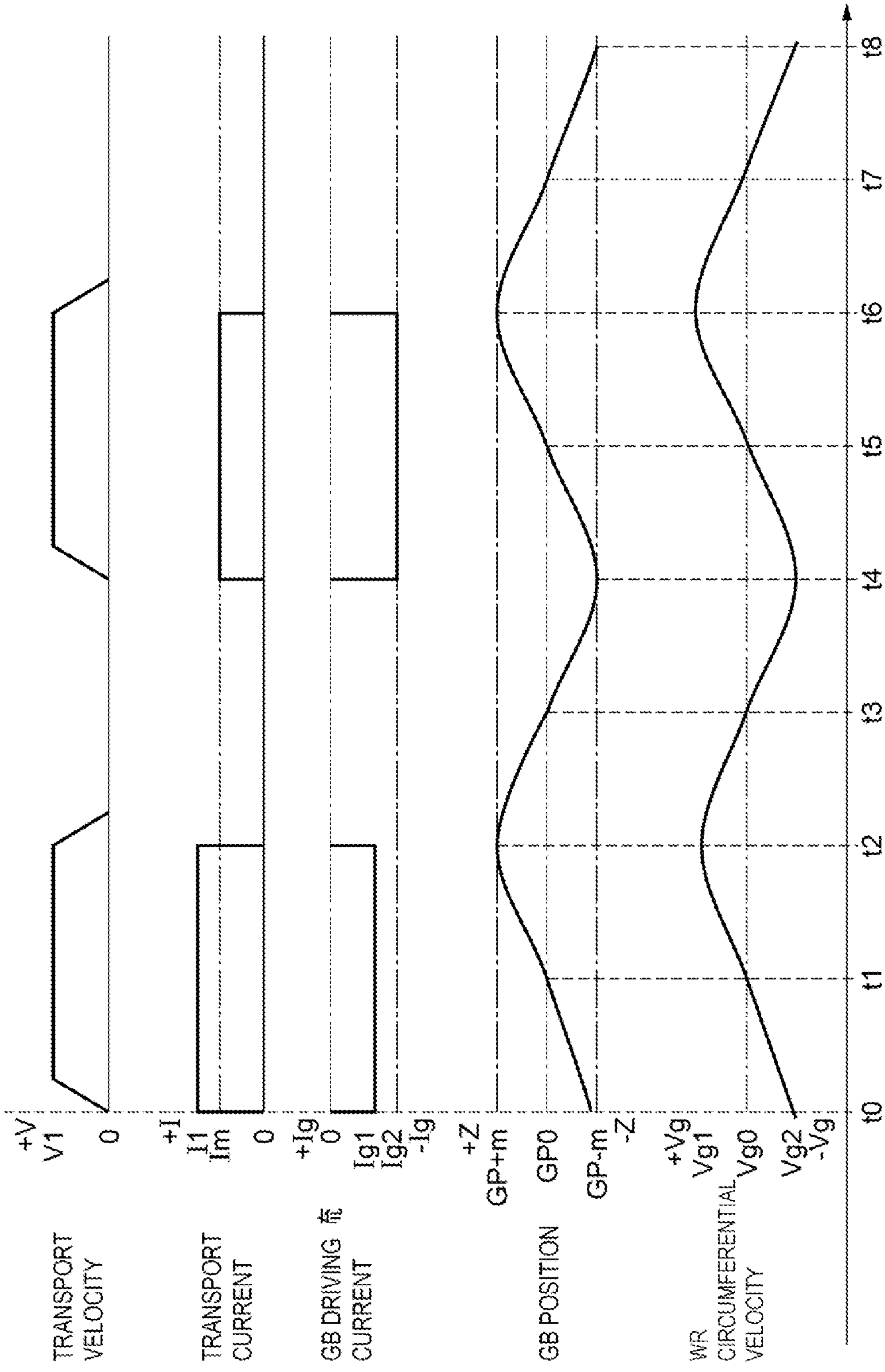
FIG. 9 is a diagram illustrating an operation of a winding unit at a time of transporting a medium.

FIG. 9 illustrates the transport operation when the printer 10 winds the medium M at the winding member 41. FIG. 9 illustrates a change over time in the transport velocity, the transport current, the guide-bar driving current, the guide-bar position, and the WR circumferential velocity. In FIG. 9, the GB represents a guide bar. The transport velocity and the transport current are equal to the transport velocity and the transport current illustrated in FIG. 4.

The guide-bar driving current is a current applied to the guide-bar driving source when the guide bar member 43 applies tension to the medium M. The guide-bar driving source is not illustrated and is included in the guide-bar driving mechanism 49. In FIG. 9, the "+Ig" represents a guide-bar driving current applied to the guide-bar driving source when the guide bar member 43 increases the tension to the medium M. In FIG. 9, the "−Ig" represents a guide-bar driving current applied to the guide-bar driving source when the guide bar member 43 reduces the tension to the medium M. The guide-bar driving mechanism 49 drives the guide-bar supporting member 46 to adjust the tension that the guide bar member 43 applies to the medium M. In the present embodiment, the guide-bar driving current applied is a negative current.

The guide-bar position represents the position of the guide bar member 43. With the swing of the guide-bar supporting member 46, the guide bar member 43 moves in the +Z direction and the −Z direction. In FIG. 9, the position of the guide-bar supporting member 46 when the guide-bar supporting member 46 is positioned at the swing center is indicated as the guide-bar swing center position GPO. In the present embodiment, when the guide-bar supporting member 46 is in the posture along the axis parallel to the X-axis, the guide bar member 43 is located at the guide-bar swing center position GPO. In FIG. 9, the +Z position represents a position of the guide bar member 43 when it is located at a position further toward the +Z direction than the guide-bar swing center position GPO. In FIG. 9, the −Z position represents a position of the guide bar member 43 when it is located at a position further toward the −Z direction than the guide-bar swing center position GPO.

The WR circumferential velocity represents a circumferential velocity of the printing medium roll 70. The winding-member driving mechanism 42 adjusts the circumferential velocity of the printing medium roll 70 with control by the controller 150. The circumferential velocity of the printing medium roll 70 is associates with the amount of winding of the medium M wound around the printing medium roll 70. The amount of winding of the medium M wound around the printing medium roll 70 is associated with the tension of the medium M between the printing medium roll 70 and the transport roller pair 24. In FIG. 9, the circumferential velocity that has been set in advance is indicated as the reference circumferential velocity Vg0. The reference circumferential velocity Vg0 is stored in the memory 152 in advance. In FIG. 9, the circumferential velocity greater than the reference circumferential velocity Vg0 is indicated as the +Vg. In FIG. 9, the circumferential velocity lower than the reference circumferential velocity Vg0 is indicated as the −Vg.

As illustrated in FIGS. 4 and 9, the operation of the supply-bar driving current is equal to the operation of the guide-bar driving current. The change over time in the guide-bar position and the circumferential velocity of the printing medium roll 70 is the same as the change over time in the supply-bar position and the roll circumferential velocity of the medium roll 60. As with the guide-bar driving current, the controller 150 is able to control the supply-bar driving current. The printer 10 is able to control the guide-bar driving current on the basis of the load applied to the transport roller pair 24, thereby adjusting the tension acting at the medium M between the transport roller pair 24 and the printing medium roll 70.

Note that the medium M is wrapped around the guide bar member 43 to apply tension to the medium M. However, the configuration is not limited to this. For example, the medium M may be pressed by an item that is brought into line contact or point contact with the medium M to apply tension to the medium M.

As described above, the transport device includes: the transport roller pair 24 configured to transport the medium M in the transport direction; the winding member 41 configured to wind the medium M transported by the transport roller pair 24; the guide bar member 43 configured such that the medium M is wrapped around between the transport roller pair 24 and the winding member 41 to apply tension to the medium M; the guide-bar driving mechanism 49 configured to provide driving force to the guide-bar supporting member 46 configured to support the guide bar member 43; the controlling unit 50 configured to control the transport roller pair 24 and the guide-bar driving mechanism 49; and the load detecting sensor 80 configured to detect a load applied to the transport roller pair 24. The controlling unit 50 controls the driving force by the guide-bar driving mechanism 49, on the basis of the load detected by the load detecting sensor 80.

By performing control in response to the detected load, the transport device is able to control the tension of the medium M from the transport roller pair 24 to the printing medium roll 70 so as to fall in a predetermined range. The transport device is able to accurately control the transport of the medium M.

Details derived from the embodiments will be described below.

The transport device includes: the holding unit configured to rotatably hold the roll body on which a medium is wound; the transport unit configured to transport the medium unwound from the roll body; the tension applying unit configured to press the medium between the holding unit and the transport unit to apply tension to the medium; the driving portion configured to provide driving force to the tension applying unit; the control unit configured to control the transport unit and the driving portion; and the detector configured to detect a load applied to the transport unit, and the control unit controls the driving force by the driving portion on the basis of the load detected by the detector to adjust the tension applied to the medium.

With this configuration, the transport device includes the tension applying unit provided between the holding unit and the transport unit, which makes it easy to eliminate the influence of inertia on the transport unit. The transport device uses the driving portion to perform control in response to the detected load, which makes it possible to perform control in a manner such that the influence of inertia of the roll body is reduced. The transport device is able to accurately control the transport of the medium.

In the transport device described above, the control unit controls the transport unit to alternately perform a medium transport operation in which the medium is transported by a predetermined amount and a medium stop operation in which transporting the medium M is stopped. In addition, during the medium stop operation, the driving portion is controlled to reduce the tension applied to the medium. In a state where the tension is reduced, the medium transport operation is performed.

With this configuration, the transport device is able to suppress a sudden increase in the load applied to the transport unit at the time of starting the operation of transporting the medium. The transport device is able to accurately control the amount of transport at the time of starting the operation of transporting the medium.

The transport device described above includes the receiving portion configured to receive input concerning the type of the medium, and the control unit corrects the driving force by the driving portion in accordance with the type of the medium received at the receiving portion.

With this configuration, the transport device is able to suppress a reduction in the accuracy of the amount of transport associated with the type of the medium. The medium adaptability of the transport device improves.

The transport device described above includes the second driving portion configured to provide the second driving force to the tension applying unit. The tension applying unit includes: the tension bar around which the medium is wrapped; the first arm configured to support one end of the tension bar; and the second arm configured to support the other end of the tension bar. The driving portion provides the driving force to the first arm. The second driving portion provides the second driving force to the second arm. The control unit controls the driving portion and the second driving portion such that the second driving force is equal to the driving force.

With this configuration, the transport device is able to transport a medium having a wide width while preventing skewing or meandering at the time of transporting the medium. For example, the transport device is able to transport the medium M while preventing skewing or meandering due to twisting of the second arm relative to the first arm.

The transport device described above includes: a winding unit configured to wind the medium transported by the transport unit; a second tension applying unit configured to press the medium between the transport unit and the winding unit to apply tension to the medium; and a third driving portion configured to provide driving force to the second tension applying unit, and the control unit controls the driving force by the third driving portion on a basis of the load detected by the detector.

With this configuration, by performing control in response to the detected load, the transport device is able to control the tension of the medium from the transport unit to the winding unit so as to fall in a predetermined range. The transport device is able to control the transport of the medium in an accurate manner.

The printing apparatus includes: the holding unit configured to rotatably hold a roll body on which a medium is wound; the transport unit configured to transport the medium unwound from the roll body; the printing unit configured to perform printing on the medium transported by the transport unit; the tension applying unit configured to press the medium between the holding unit and the transport unit to apply tension to the medium; the driving portion configured to provide driving force to the tension applying unit; the control unit configured to control the transport unit and the driving portion; the detector configured to detect a load applied to the transport unit, and the control unit controls the driving force by the driving portion on the basis of the load detected by the detector.

With this configuration, the printing apparatus includes the tension applying unit provided between the holding unit and the transport unit, which makes it easy to eliminate the influence of inertia on the transport unit. The printing apparatus uses the driving portion to perform control in response to the detected load, which makes it possible to perform control in a manner such that the influence of inertia of the roll body is reduced. The printing apparatus is able to control the transport of the medium in an accurate manner.

The transport controlling method includes: transporting, by a transport unit, a medium wound in a roll body held by a holding unit; pressing, by a tension applying unit, the medium between the holding unit and the transport unit to apply tension to the medium; detecting a load applied to the transport unit; and controlling a driving portion configured to provide driving force to the tension applying unit on the basis of the detected load.

With this configuration, the transport device includes the tension applying unit provided between the holding unit and the transport unit, which makes it easy to eliminate the influence of inertia on the transport unit. The transport device uses the driving portion to perform control in response to the detected load, which makes it possible to perform control in a manner such that the influence of inertia of the roll body is reduced. The transport device is able to control the transport of the medium in an accurate manner.

What is claimed is:

1. A transport device comprising:

a holding unit configured to rotatably hold a roll body on which a medium is wound;

a transport unit configured to transport the medium unwound from the roll body;

a tension applying unit configured to press the medium between the holding unit and the transport unit to apply tension to the medium;

a first driving portion configured to provide a first driving force to the tension applying unit;

a control unit configured to control the transport unit and the driving portion;

a detector configured to detect a load applied to the transport unit, a winding unit configured to wind the medium transported by the transport unit;

a second tension applying unit configured to press the medium between the transport unit and the winding unit to apply tension to the medium; and a third driving portion configured to provide a third driving force to the second tension applying unit, wherein the control unit controls the driving force by the driving portion on a basis of the load detected by the detector to adjust the tension applied to the medium, and the control unit controls the third driving force by the third driving portion on a basis of the load detected by the detector.

2. The transport device according to claim 1, wherein the control unit controls the transport unit to alternately perform a medium transport operation of transporting the medium by a predetermined amount and a medium stop operation of stopping transportation of the medium, during the medium stop operation, the driving portion is controlled to reduce the tension applied to the medium, and in a state where the tension is reduced, the medium transport operation is performed.

3. The transport device according to claim 1 comprising a receiving portion configured to receive input concerning a type of the medium, wherein the control unit corrects the driving force by the driving portion in accordance with the type of the medium received at the receiving portion.

4. The transport device according to claim 1 comprising a second driving portion configured to provide a second driving force to the tension applying unit, the tension applying unit including:

a tension bar around which the medium is wrapped;

a first arm configured to support one end of the tension bar; and a second arm configured to support another end of the tension bar, wherein the driving portion provides the driving force to the first arm, the second driving portion provides the second driving force to the second arm, and the control unit controls the driving portion and the second driving portion such that the second driving force is equal to the first driving force.

5. A printing apparatus comprising:

a holding unit configured to rotatably hold a roll body on which a medium is wound;

a transport unit configured to transport the medium unwound from the roll body;

a printing unit configured to perform printing on the medium transported by the transport unit;

a tension applying unit configured to press the medium between the holding unit and the transport unit to apply tension to the medium;

a first driving portion configured to provide a first driving force to the tension applying unit;

a control unit configured to control the transport unit and the driving portion; and a detector configured to detect a load applied to the transport unit, a winding unit configured to wind the medium transported by the transport unit;

a second tension applying unit configured to press the medium between the transport unit and the winding unit to apply tension to the medium; and a second driving portion configured to provide a second driving force to the second tension applying unit, wherein the control unit controls the driving force by the driving portion on a basis of the load detected by the detector, and the control unit controls the second driving force by the second driving portion on a basis of the load detected by the detector.

6. A transport controlling method comprising:

transporting, by a transport unit, a medium wound in a roll body held by a holding unit;

pressing, by a first tension applying unit, the medium between the holding unit and the transport unit to apply tension to the medium;

detecting a load applied to the transport unit;

winding, by a winding unit, the medium transported by the transport unit;

pressing, by a second tension applying unit, the medium between the winding unit and the transport unit to apply tension to the medium;

controlling a first driving portion configured to provide a first driving force to the first tension applying unit on a basis of the detected load; and controlling a second driving portion configured to provide a second driving force to the second tension applying unit on a basis of the detected load.

* * * * *